United States Patent
Krishnamurthy et al.

(10) Patent No.: US 6,813,422 B1
(45) Date of Patent: *Nov. 2, 2004

(54) FLEXIBLE FIBER OPTIC CABLE

(75) Inventors: Karthik C. Krishnamurthy, Greenville, SC (US); Joseph A. Cignarale, Greer, SC (US); Michael H. Turenne, Campobello, SC (US)

(73) Assignee: Alcoa Fujikura Limited, Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/601,403

(22) Filed: Jun. 23, 2003

(51) Int. Cl.[7] .................................................. G02B 6/44
(52) U.S. Cl. ...................................... 385/109; 385/114
(58) Field of Search ............................ 385/109, 112, 385/101, 114, 113, 104, 105, 110

(56) References Cited

U.S. PATENT DOCUMENTS

| | | | |
|---|---|---|---|
| 4,568,144 A | 2/1986 | Occhini et al. | 350/96.23 |
| 4,743,085 A | 5/1988 | Jenkins et al. | 350/96.23 |
| 4,844,575 A | 7/1989 | Kinard et al. | 350/96.23 |
| 5,013,127 A | 5/1991 | Bernard | 350/96.23 |
| 5,082,348 A | 1/1992 | Gartside, III et al. | 385/111 |
| 5,651,081 A * | 7/1997 | Blew et al. | 385/101 |
| 5,748,823 A | 5/1998 | Nave | 385/113 |
| 5,822,485 A | 10/1998 | Nelson et al. | 385/112 |
| 5,838,864 A | 11/1998 | Patel et al. | 385/113 |
| 5,852,698 A | 12/1998 | Bringuier | 385/113 |
| 5,917,978 A | 6/1999 | Rutterman | 385/109 |
| 6,178,278 B1 | 1/2001 | Keller et al. | 385/109 |
| 6,195,487 B1 | 2/2001 | Anderson et al. | 385/101 |
| 6,356,690 B1 * | 3/2002 | McAlpine et al. | 385/109 |
| 6,529,663 B1 * | 3/2003 | Parris et al. | 385/113 |
| 6,546,175 B1 * | 4/2003 | Wagman et al. | 385/113 |
| 6,553,167 B2 | 4/2003 | Hurley et al. | 385/102 |
| 6,681,071 B2 * | 1/2004 | Newton et al. | 385/113 |
| 2002/0145069 A1 | 10/2002 | Nechitailo et al. | 242/520 |
| 2002/0197030 A1 | 12/2002 | McAlpine et al. | 385/103 |
| 2003/0059183 A1 * | 3/2003 | Militaru | 385/112 |
| 2003/0223714 A1 * | 12/2003 | Conrad et al. | 385/114 |

* cited by examiner

*Primary Examiner*—Chandrika Prasad
(74) *Attorney, Agent, or Firm*—Tracey D. Beiriger

(57) ABSTRACT

A fiber optic cable includes an outer jacket, a first core tube positioned within the outer jacket, and a first plurality of optical fibers positioned within the first core tube, wherein the cross-sectional area of the first plurality of optical fibers is less than 60 percent of the cross-section inside area of the first core tube and wherein the length of each optical fiber in the first plurality of optical fibers is between 1.0 and 1.001 times the length of the first core tube.

9 Claims, 3 Drawing Sheets

FLEXIBLE FIBER OPTIC CABLE

FIELD OF THE INVENTION

This invention relates to fiber optic cables and, more particularly to fiber optic cables that include a plurality of optical fibers in one or more buffer tubes.

BACKGROUND OF THE INVENTION

Optical fibers are very small diameter glass strands which are capable of transmitting an optical signal over great distances, at high speeds, and with relatively low signal loss as compared to standard wire or cable (including wire cable) networks. Many applications of optical fibers require the individual fibers to be placed into groupings, such as in fiber optic cables.

Fiber optic cables are widely used in communications systems. One type of fiber optic cable, referred to as a unitube fiber optic cable, includes an outer jacket surrounding a tube, which contains one or more optical fibers.

Cold temperatures can adversely affect fiber optic cable, since the temperature coefficient of expansion (TCE), also called the coefficient of thermal expansion (CTE), is quite large for dielectric materials, typically plastics or other non-glass materials, versus the optical fiber. When the cable is exposed to cold temperatures, the cable structural elements contract more than the fiber. In unitube fiber optic cables, there are commonly three approaches to obtaining cold temperature performance. One is to have adequate free space in the tube, the second is to have stiffening rods built into the cable and the third is a combination of free space and stiffening rods.

Typically in a unitube cable there is some free space in the tube, which encases the fiber to allow the fiber to assume a serpentine (sinusoidal) type shape as the cable structure contracts. If this effect is too large it can cause optical attenuation that results in an unusable cable. The tube can be made large enough to accommodate this effect. However, this increases the overall diameter of the cable.

Manufacturers typically use a combination of this free space with either metallic or dielectric strength members whose TCE is very close to that of optical fiber and that have a high modulus (>50 Gpa is typical). These strength members restrict the contraction of the composite cable minimizing the amount of free space required in the unitube. This approach also increases the diameter of the cable, as the profile of the strength members is typically round and the outer jacket must have adequate thickness to prevent the strength members from separating from the jacket when the cable is exposed to bends.

In addition, the use of these strength members can create additional issues. When only two strength members are used, they are typically oriented 180 degrees apart and are located either in the outer jacket of the cable or at the inside wall of the outer jacket. This creates a preferred bend orientation, since the two strength members, with their high modulus, will cause the cable to twist until the strength members are on the neutral axis of bend.

There is a need for a fiber optic cable that can withstand low temperatures and avoids the disadvantages of prior designs.

SUMMARY OF THE INVENTION

Fiber optic cables constructed in accordance with this invention include an outer jacket, a first core tube positioned within the outer jacket, and a first plurality of optical fibers positioned within the first core tube, wherein the cross-sectional area of the first plurality of optical fibers is less than 60 percent of the cross-sectional inside area of the first core tube and wherein the length of each optical fiber in the first plurality of optical fibers is between 1.0 and 1.001 times the length of the first core tube.

Strength members can be positioned between the outer jacket and the first core tube. The core tube and outer jacket can be made of a material selected from the group consisting of: polyvinyl chloride, polyvinylidene fluoride homopolymer, and polyvinylidene fluoride copolymer.

In another embodiment, a second core tube can be positioned within the outer jacket, and a second plurality of optical fibers can be positioned within the second core tube, wherein the cross-sectional area of the second plurality of optical fibers is less than 60 percent of the cross-sectional inside area of the second core tube and wherein the length of each optical fiber in the second plurality of optical fibers is between 1.0 and 1.001 times the length of the second core tube. The second core tube can be aligned substantially parallel to the first core tube and the outer jacket can define a tearable web section in between the first and second core tubes.

In another embodiment, a plurality of core tubes can be positioned within the outer jacket, and optical fibers can be positioned within each of the plurality of core tubes, wherein the total cross-sectional area of the optical fibers in each of the core tubes is less than 60 percent of the cross-sectional inside area of the core tube in which those optical fibers are located, and wherein the length of each optical fiber is between 1.0 and 1.001 times the length of the core tube in which each optical fiber is located. The plurality of core tubes can be helically wound with respect to each other. Electrical conductors can be positioned within the outer jacket and the electrical conductors can be helically wound with respect to each other and the core tubes.

DETAILED DESCRIPTION OF PREFERRED EMBODIMENTS

Figure 1:
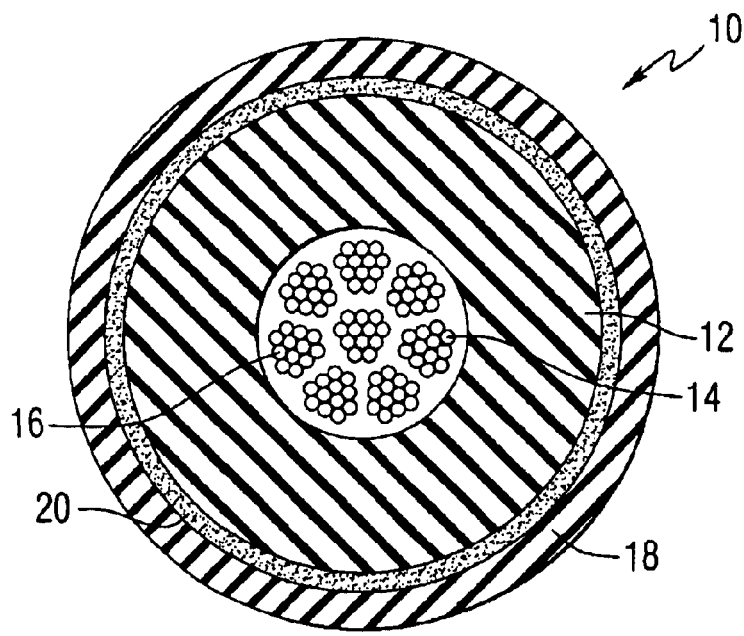
FIG. 1 is a cross-sectional view of a fiber optic cable constructed in accordance with the invention.

Referring to the drawings, FIG. 1 is a cross-sectional view of a fiber optic cable 10 constructed in accordance with the invention. The fiber optic cable includes a centrally located core tube, also referred to as a buffer tube, 12. A plurality of optical fibers 14 is positioned within the tube. The optical fibers are bundled into a plurality of groups 16. Each of the groups can be wrapped in a color-coded string binder. The total cross-sectional area of the first plurality of optical fibers is less than 60 percent of the cross-sectional inside area of the first core tube.

The core tube is positioned in an outer jacket 18. A plurality of strength members 20 can be positioned between the core tube and the outer jacket. The strength members can be arranged in a single layer to minimize the cable diameter. Alternatively, multiple layers of strength members could be used. In the embodiment of FIG. 1, the core tube and outer jacket can be made of a material selected from the group consisting of: polyvinyl chloride (PVC), polyvinylidene fluoride (PVDF) homopolymer, and PVDF copolymer. The strength members can be aramid strands that are shaped to provide a very low profile that reduces the size of the cable.

Figure 2:
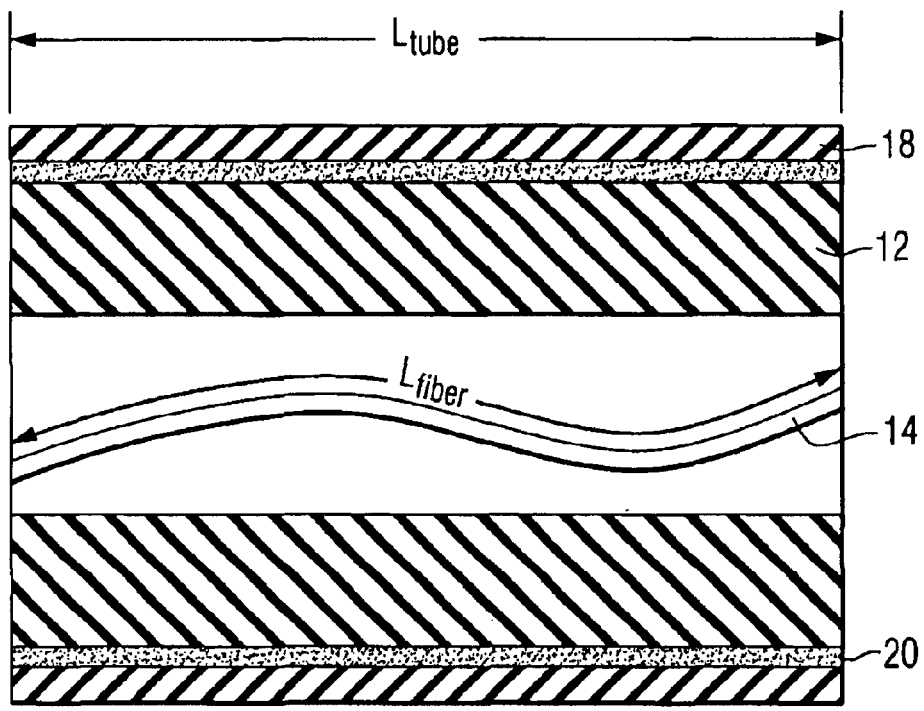
FIG. 2 is a longitudinal cross-sectional view of a fiber optic cable constructed in accordance with the invention.

FIG. 2 is a longitudinal cross-sectional view of a fiber optic cable constructed in accordance with the invention. In FIG. 2, only one optical fiber is shown and the bend in the optical fiber has been exaggerated for illustration purposes. The segment of cable shown in FIG. 2 has a core tube length of $L_{tube}$, The optical fiber has a length, $L_{fiber}$. The length of each of the optical fibers in the first plurality of optical fibers is between 1.0 and 1.001 times the length of the first core tube, that is: $L_{tube} \leq L_{fiber} \leq (1.001 \times L_{tube})$.

Figure 3:
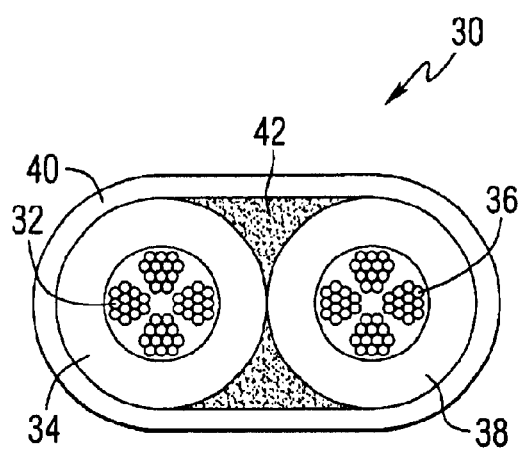
FIG. 3 is a cross-sectional view of another fiber optic cable constructed in accordance with the invention.

FIG. 3 is a cross-sectional view of another fiber optic cable 30 constructed in accordance with the invention. The cable of FIG. 3 includes a first plurality of optical fibers 32 in a first core tube 34 and a second plurality of optical fibers 36 in a second core tube 38. The second core tube is aligned substantially parallel to the first core tube. An outer jacket 40 surrounds the first and second core tubes. Strength members 42 can be positioned in the spaces between the core tubes. The total cross-sectional area of the optical fibers in each of the core tubes is less than 60 percent of the cross-sectional inside area of the tubes. The length of each of the optical fibers is between 1.0 and 1.001 times the length of the core tubes.

Figure 4:
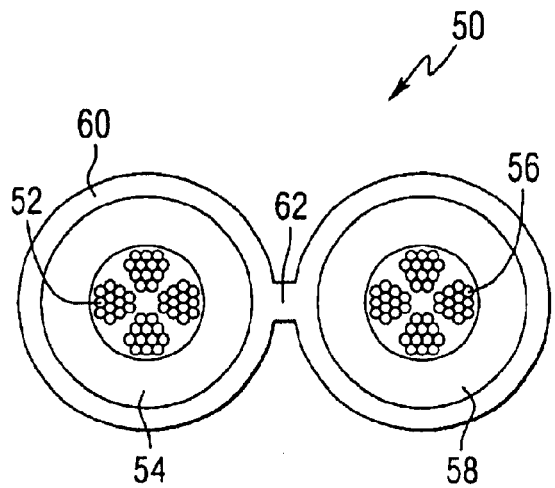
FIG. 4 is a cross-sectional view of another fiber optic cable constructed in accordance with the invention.

FIG. 4 is a cross-sectional view of another fiber optic cable 50 constructed in accordance with the invention. The cable of FIG. 4 includes a first plurality of optical fibers 52 in a first core tube 54 and a second plurality of optical fibers 56 in a second core tube 58, with the second core tube being aligned substantially parallel to the first core tube. An outer jacket 60 surrounds the first and second core tubes and defines a tear section 62 between the core tubes. The total cross-sectional area of the optical fibers in each of the core tubes is less than 60 percent of the cross-sectional inside area of the tubes. The length of each of the optical fibers is between 1.0 and 1.001 times the length of the core tubes.

Figure 5:
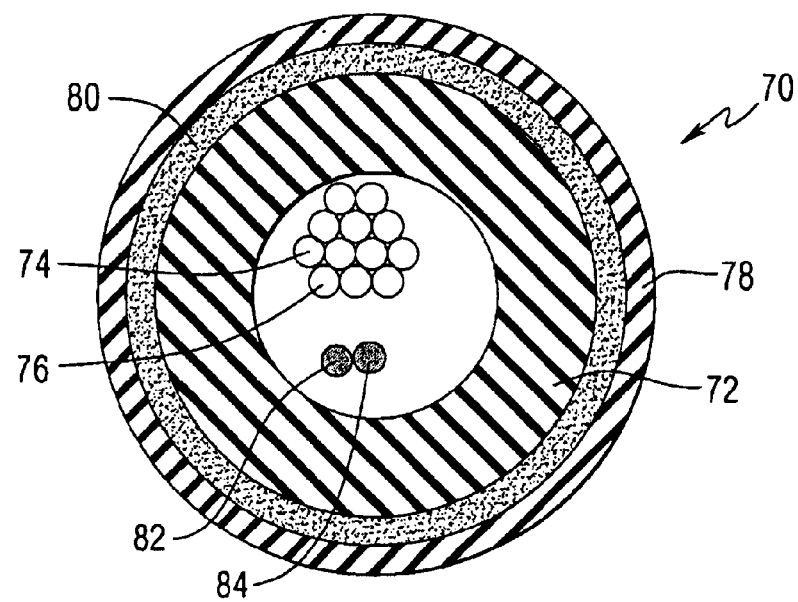
FIG. 5 is a cross-sectional view of another fiber optic cable constructed in accordance with the invention.

FIG. 5 is a cross-sectional view of another fiber optic cable 70 constructed in accordance with the invention. The fiber optic cable includes a centrally located core tube, also referred to as a buffer tube, 72. A plurality of optical fibers 74 is positioned within the tube. The optical fibers are bundled into a group 76. The group can be wrapped in a color-coded string binder. The total cross-sectional area of the first plurality of optical fibers is less than 60 percent of the cross-sectional inside area of the first core tube.

The core tube is positioned in an outer jacket 78. A plurality of strength members 80 can be positioned between the core tube and the outer jacket. The strength members can be arranged in a single layer to minimize the cable diameter. Alternatively, multiple layers of strength members could be used. Electrical conductors 82 and 84 are positioned within the tube. The core tube and outer jacket can be made of a material selected from the group consisting of: polyvinyl chloride (PVC), polyvinylidene fluoride (PVDF) homopolymer, and PVDF copolymer.

Figure 6:
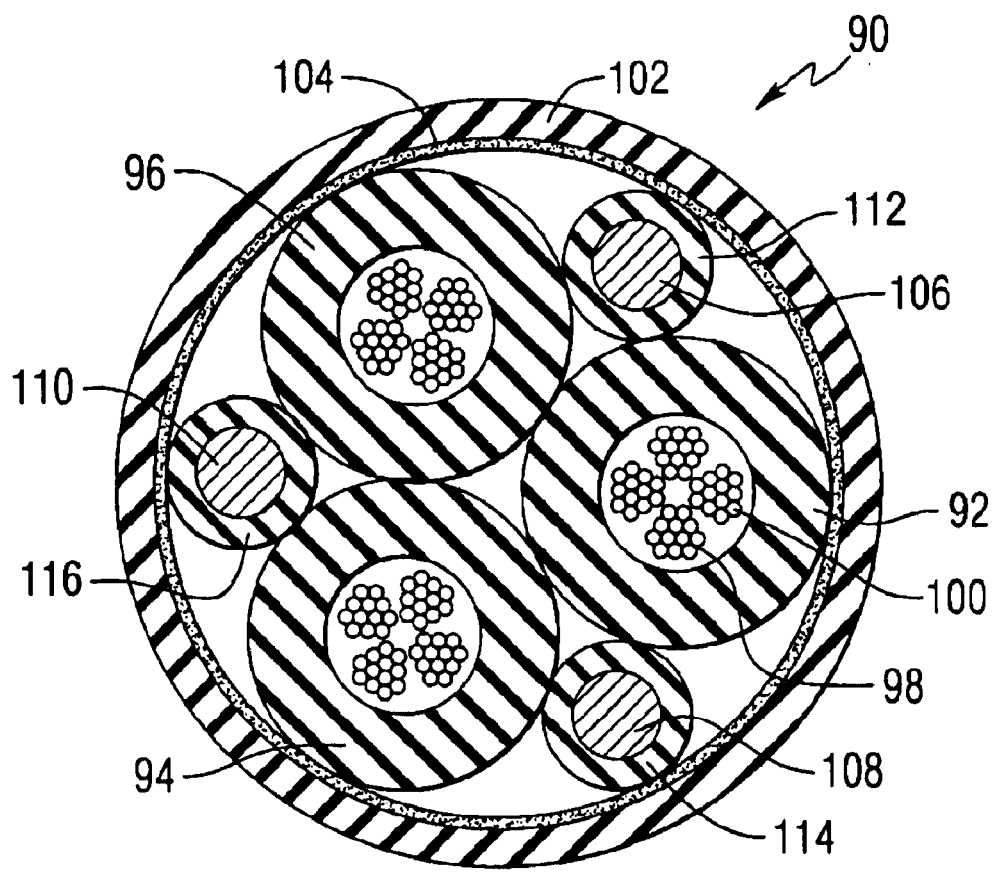
FIG. 6 is a cross-sectional view of another fiber optic cable constructed in accordance with the invention.

FIG. 6 is a cross-sectional view of another fiber optic cable 90 constructed in accordance with the invention. The fiber optic cable includes a plurality of core tubes, also referred to as buffer tubes, 92, 94 and 96. A plurality of optical fibers 98 is positioned within each of the tubes. The optical fibers are bundled into a plurality of groups 100. Each of the groups can be wrapped in a color-coded string binder. The total cross-sectional area of the optical fibers in each of the tubes is less than 60 percent of the cross-sectional inside area of the tube in which they are positioned. The length of each of the optical fibers is between 1.0 and 1.001 times the length of the core tubes in which they are positioned.

The core tubes are positioned in an outer jacket 102. A plurality of strength members 104 can be positioned between the core tube and the outer jacket. The strength members can be arranged in a single layer to minimize the cable diameter. Alternatively, multiple layers of strength members could be used. Electrical conductors 106, 108 and 110 are also positioned within the outer jacket. Each electrical conductor is encased in insulation 112, 114 and 116. The core tubes and outer jacket can be made of a material selected from the group consisting of: polyvinyl chloride (PVC), polyvinylidene fluoride (PVDF) homopolymer, and PVDF copolymer. Cables constructed in accordance with FIG. 6, but without the electrical conductors, are also within the scope of this invention.

Figure 7:
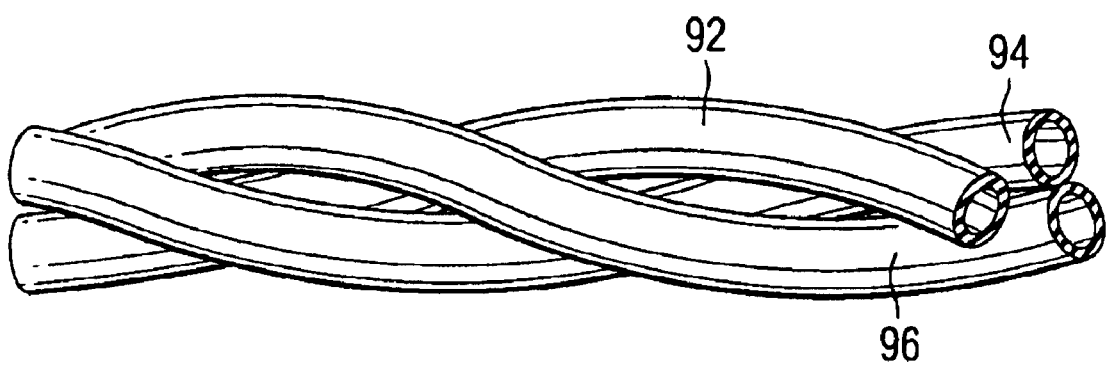
FIG. 7 is a side view of selected components of a fiber optic cable constructed in accordance with the invention.

FIG. 7 is a side view of buffer tubes 92, 94 and 96 of another fiber optic cable constructed in accordance with the invention. FIG. 7 illustrates that the buffer tubes can be helically wound together. If electrical conductors are included in the cable, those conductors can also be helically wound together with the buffer tubes. By helically winding the buffer tubes and/or electrical conductors, a preferential bending direction is avoided.

This invention provides loose tube fiber optic cables that can operate over a wide temperature range of, for example −20° C. to +70° C., and are extremely flexible. In the embodiment of FIG. 1, the cable is equally bendable in all directions. By restricting the total cross-sectional area of the optical fibers in each of the core tubes to less than 60 percent of the cross-sectional inside area of the tube, and the length of each of the optical fibers to between 1.0 and 1.001 times the length of the core tube, the minimum bend radius of the cable can be reduced.

Based on the choice of the aforementioned plastics for the Core Tube and the jacket, this invention provides a telecommunications cable that is capable of passing the UL-1666 test defined in the UL Standard for Test for Flame Propagation Height of Electrical and Optical-Fiber Cables Installed Vertically in Shafts.

Based on the choice of the aforementioned plastics for the Core Tube and the jacket, this invention provides a telecommunications cable that is capable of passing the UL-910 test defined in the UL Standard for Test for Flame-Propagation and Smoke-Density Values for Electrical and Optical-Fiber Cables Used in Spaces Transporting Environmental Air.

The contraction of the cable is limited at a cold temperature of, for example −20° C., by the choice of the plastic for the core tube and jacket, and the coupling between them. The power increase of the optical fibers in the cable with respect to a baseline measurement at 23° C. is limited at the cold temperature of −20° C. to 0.3 dB/km for Single Mode fibers and 0.6 dB/km for Multimode fibers.

While the present invention has been described in terms of particular embodiments, it will be apparent to those skilled in the art that various changes can be made to the disclosed embodiments without departing from the scope of the invention as set forth in the following claims.

What is claimed is:

1. A fiber optic cable comprising:

an outer jacket;

a first core tube positioned within the outer jacket; and a first plurality of optical fibers positioned within the first core tube;

wherein the cross-sectional area of the first plurality of optical fibers is less than 60 percent of the cross-sectional inside area of the first core tube and wherein the length of each optical fiber in the first plurality of optical fibers is between 1.0 and 1.001 times the length of the first core tube.

2. A fiber optic cable according to claim 1, further comprising:

a plurality of strength members positioned between the outer jacket and the first core tube.

3. A fiber optic cable according to claim 1, wherein the first core tube is made of a material selected from the group consisting of: polyvinyl chloride, polyvinylidene fluoride homopolymer, and polyvinylidene fluoride copolymer; and wherein the outer jacket is made of a material selected from the group consisting of: polyvinyl chloride, polyvinylidene fluoride homopolymer, and polyvinylidene fluoride copolymer, wherein the fiber optic cable is a loose tube fiber optic cable that can operate over a temperature range of from −20° C. to +70° C., is flexible, and is equally bendable in all directions.

4. A fiber optic cable according to claim 1, further comprising:

a second core tube positioned within the outer jacket;

a second plurality of optical fibers positioned within the second core tube;

wherein the cross-sectional area of the second plurality of optical fibers is less than 60 percent of the cross-sectional inside area of the second core tube and wherein the length of each optical fiber in the second plurality of optical fibers is between 1.0 and 1.001 times the length of the second core tube.

5. A fiber optic cable according to claim 4, wherein the second core tube is aligned substantially parallel to the first core tube, and outer jacket defines a tearable web section in between the first and second core tubes.

6. A fiber optic cable according to claim 1, further comprising:

a second core tube positioned within the outer jacket;

a second plurality of optical fibers positioned within the second core tube;

wherein the cross-sectional area of the second plurality of optical fibers is less than 60 percent of the cross-sectional inside area of the second core tube and wherein the length of each optical fiber in the second plurality of optical fibers is between 1.0 and 1.001 times the length of the second core tube;

a third core tube positioned within the outer jacket;

a third plurality of optical fibers positioned within the third core tube; and wherein the cross-sectional area of the third plurality of optical fibers is less than 60 percent of the cross-sectional inside area of the third core tube and wherein the length of each optical fiber in the third plurality of optical fibers is between 1.0 and 1.001 times the length of the third core tube.

7. A fiber optic cable according to claim 6, wherein the first, second and third core tubes are helically wound with respect to each other.

8. A fiber optic cable according to claim 6, further comprising a plurality of electrical conductors positioned within the outer jacket.

9. A fiber optic cable according to claim 6, wherein the first, second and third core tubes and the plurality of electrical conductors are helically wound with respect to each other.

* * * * *